(12) United States Patent
Murakata et al.

(10) Patent No.: US 6,750,642 B2
(45) Date of Patent: Jun. 15, 2004

(54) POWER CONSERVING REGULATOR HAVING INTERMITTENTLY CONNECTABLE CONTROLLER

(75) Inventors: Masaki Murakata, Yamagata (JP); Naoki Noda, Yamanashi (JP); Shinji Kuriki, Yamanashi (JP)

(73) Assignees: Tohoku Pioneer Corporation, Yamagata (JP); Pioneer Video Corporation, Yamanashi-Ken (JP)

( * ) Notice: Subject to any disclaimer, the term of this patent is extended or adjusted under 35 U.S.C. 154(b) by 0 days.

(21) Appl. No.: 10/212,056

(22) Filed: Aug. 6, 2002

(65) Prior Publication Data

US 2003/0030419 A1 Feb. 13, 2003

(30) Foreign Application Priority Data

Aug. 13, 2001 (JP) ..................... P2001-245153

(51) Int. Cl.[7] .................................................. H02J 1/00
(52) U.S. Cl. ....................................... 323/323; 323/222
(58) Field of Search .................. 323/222, 283, 323/284, 323, 351

(56) References Cited

U.S. PATENT DOCUMENTS

| 4,634,956 | A | * | 1/1987 | Davis et al. | ................. | 323/222 |
| 6,011,382 | A | * | 1/2000 | Littlefield et al. | .......... | 323/222 |
| 6,366,066 | B1 | * | 4/2002 | Wilcox | ........................ | 323/282 |

* cited by examiner

*Primary Examiner*—Shawn Riley
(74) *Attorney, Agent, or Firm*—Sughrue Mion, PLLC (57) ABSTRACT

In a DC—DC converter, a regulator circuit 14 acts to drive a switching element Q1 based on an error between a detected voltage obtained by a voltage divider circuit 11 and a reference voltage from a reference voltage generating circuit 12 and to output a step-up voltage by a coil L1 to an output terminal Vout. A timing generating circuit 16 acquires a driving interval of the switching element Q1 set by the regulator circuit 14 and then decides that, if the interval is long, a load is in a light load state. In this case, the timing generating circuit 16 controls to supply a driving power to an output voltage controller intermittently by driving switching unit S1, S2.

17 Claims, 5 Drawing Sheets

FIG. 5 PRIOR ART

POWER CONSERVING REGULATOR HAVING INTERMITTENTLY CONNECTABLE CONTROLLER

BACKGROUND OF THE INVENTION

1. Field of the Invention

The present invention relates to a DC—DC converter and, more particularly, a DC—DC converter constructed such that a power consumed in the converter can be reduced in the state that a load applied to the converter is a light load and a driving method for the same.

2. Description of the Related Art

As is well known, the DC—DC converter functions to convert the input DC voltage into the different DC voltage, and is often used as the driving power supply for the DC driving circuit having the relatively light load. The output voltage of this DC—DC converter must be stabilized to the predetermined voltage value, and also the consumption power in the converter must be reduced as small as possible if the case that such DC—DC converter is installed into the mobile terminal, etc. is considered.

By the way, recently the organic EL display that employs the organic EL element as the light emitting source, for example, is watched with interest as the display means used in the above mobile terminal, etc. and there is a tendency to utilize this display. In order to lighten/drive the above organic EL element, normally the DC voltage of about 10 to 20 V is required. Therefore, in the case that this organic EL display is utilized in the mobile terminal or the vehicle equipment, the driving voltage value is insufficient and thus the driving voltage must be increased by the DC—DC converter.

In contrast, the output current of the DC—DC converter is largely varied according to the lighting state of the organic EL display. For example, the consumption current becomes large if the number of the lighted pixels is large and the lightening brightness at that time is high, while the consumption current becomes small if the number of the lighted pixels is small and the lightening brightness at that time is low.

Figure 5:
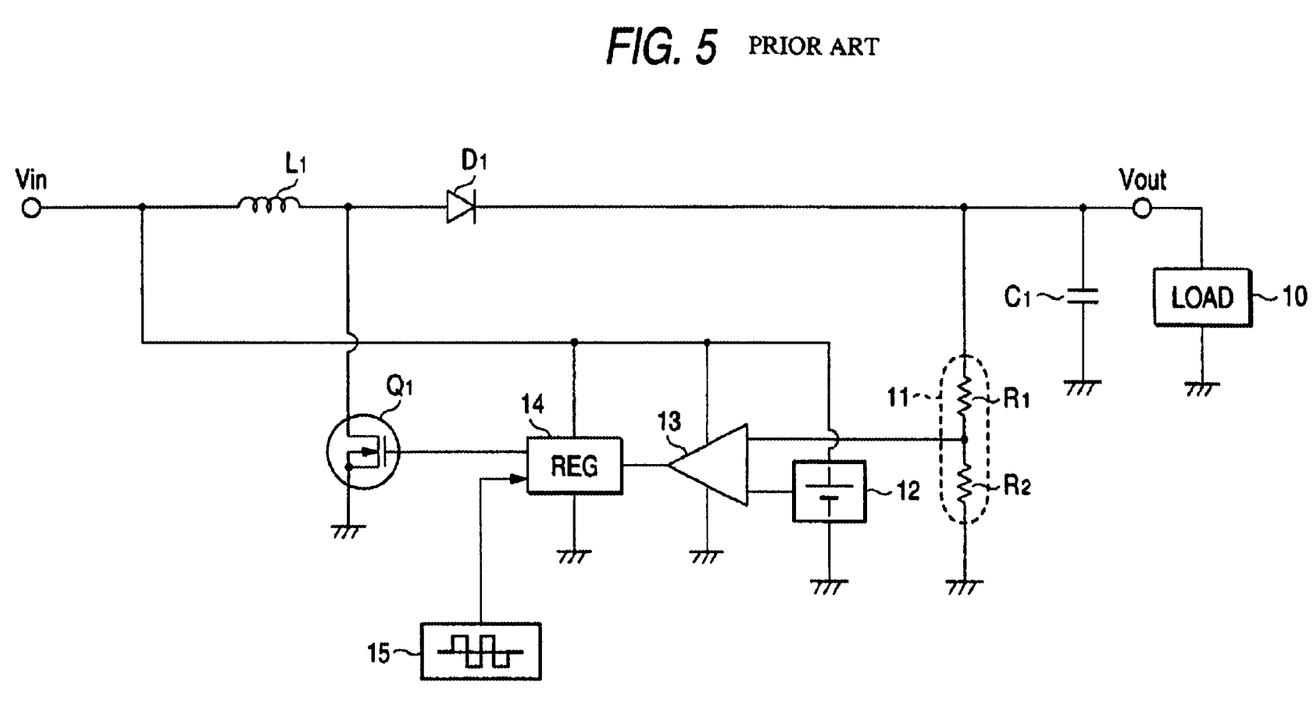
FIG. 5 is a block diagram showing an example of the DC—DC converter in the prior art.

FIG. 5 shows an example of the step-up type DC—DC converter that is employed preferably in the case that the above organic EL display is used as the load, for example. In FIG. 5, a symbol Vin denotes a power-supply input terminal of the DC—DC converter, i.e., a terminal to which the voltage that is fed from the primary battery, etc. is supplied. The coil L1 is connected to the input terminal Vin, the diode D1 is connected in parallel with the coil L1, and the cathode side of the diode D1 constitutes the output terminal Vout. Then, the voltage holding capacitor C1 is connected between the output terminal Vout and the reference potential point (earth). The output voltage of the converter, which is held by the capacitor C1, is supplied to the load 10.

The voltage divider circuit 11, which consists of the resistor R1 and the resistor R2 to detect the output voltage of the converter, is connected between the output terminal Vout and the earth. The detected voltage generated by this voltage divider circuit 11 is supplied to one input terminal of the error amplifier 13 constituting the error detecting circuit. Also, the reference voltage generated in the reference voltage generating circuit 12 is supplied to the other input terminal of the error amplifier 13, so that the error output signal that is generated pursuant to the variation of the output voltage of the converter is output from the error amplifier 13.

The error output signal generated by the error amplifier 13 is supplied to the regulator circuit 14 constituting the output voltage adjusting circuit. The gate terminal of the n-type MOSFET Q1 serving as the switching element is connected to the output terminal of this regulator circuit 14. Also, the drain terminal of the FET Q1 is connected to the coil L1 on the output terminal Vout side, and the source terminal thereof is grounded. Also, the reference clock signal that is fed from the reference clock generating circuit 15 is supplied to the regulator circuit 14.

In addition, the operating power supply is supplied to the output voltage controlling means that controls the output voltage of the converter in the predetermined range, i.e., the voltage divider circuit 11, the reference voltage generating circuit 12, the error amplifier 13, and the regulator circuit 14, from the input terminal Vin and the output terminal Vout respectively.

In the above circuit configuration, if the FET Q1 is turned ON by the control signal (switching signal) from the regulator circuit 14, the current flows to the coil L1 from the input terminal Vin and thus the electromagnetic energy is accumulated in the coil L1. Then, if the FET Q1 is turned OFF, the electromotive force is generated in the coil L1 by the energy accumulated in the coil L1 and thus the current flows via the diode D1. Therefore, the voltage at the output terminal Vout is caused to increase. As a result, the voltage that is higher than that at the input terminal Vin generated at the output terminal Vout.

In the above DC—DC converter, normally two methods are known as the control method that maintains the output voltage in the almost constant range. One is the PWM (Pulse Width Modulation) system, and the other is the PFM (Pulse Frequency Modulation) system. The former PWM system controls to change the ON-time of the FET Q1 serving as the switching element based on the difference between the voltage that is the divided voltage of the output voltage (detected voltage) and the reference voltage. That is, if the difference is large in the state of the reference voltage>the detected voltage, the time during which the FET Q1 is turned ON is controlled to extend. Accordingly, the electromagnetic energy accumulated in the coil L1 is increased and consequently the detected voltage is controlled such that such voltage is made equal to the reference voltage. Thus, the output voltage of the converter is controlled to stay in the predetermined range.

On the contrary, the latter PFM system sets the ON-time of the above FET Q1 constant, and then controls such that the step-up operation is carried out by turning ON the FET Q1 periodically if the difference is in the state of the reference voltage>the detected voltage while the step-up operation is not carried out by stopping the ON-operation of the switching element Q1 temporarily if the difference become the state of the reference voltage≦the detected voltage. As a result, the detected voltage is controlled such that such detected voltage can be set equally to the reference voltage, and thus the output voltage of the converter can be controlled within the predetermined range. If any system is employed, the timing to start the step-up operation (ON-operation of the switching element Q1) can be set by the reference clock that is supplied by the above reference clock generating circuit 15.

Meanwhile, as described above, in the DC—DC converter of this type, the operating power supply is always supplied to the output voltage controlling means that controls the output voltage of the converter in the predetermined range, i.e., the voltage divider circuit 11, the reference voltage generating circuit 12, the error amplifier 13, and the regulator circuit 14, from the input terminal Vin and the output terminal Vout respectively, and respective circuits are driven by this operating power supply. In other words, it is understood that the output voltage controlling means consisting of above respective circuits always consumes the power in the middle of the operation of the DC—DC converter.

Therefore, in the case that the organic EL display panel that is driven by the output voltage of the above DC—DC converter is considered, if the number of the lighted pixels is small and the lightening brightness at that time is low, the consumption current is very small. As a result, such a situation is brought about that the power consumed in the above output voltage controlling means of the DC—DC converter is in excess of the power consumed in the emission of the display panel. Although depending upon various conditions, sometime the power consumed in the output voltage controlling means of the above converter becomes several time to several tens times the power required to drive the display panel.

As described above, in the above DC—DC converter having the conventional configuration, the predetermined power is always consumed in the output voltage controlling means of the above converter irrespective of the level of the output power supplied from the converter. Thus, in the case that the output power supplied to the load is small, the power consumed in the output voltage controlling means of the above converter accounts for a high rate of the consumption power in the load. In other words, the dead power that does not contribute to drive the load is consumed in the converter.

SUMMARY OF THE INVENTION

The present invention has been made in view of the above problem, and it is an object of the present invention to provide a DC—DC converter constructed such that a power consumed in the converter can also be reduced in the case that a power consumed in a load is small (in the case of light load) to thereby improve a power utilization efficiency and a driving method for the same.

In order to achieve the above object, a DC—DC converter according to the present invention having an output voltage controlling means for getting an output voltage of a converter and then controlling the output voltage of the converter within a predetermined range based the voltage, comprises an operating power supply supplying means for supplying an operating power supply, which operates the output voltage controlling means, intermittently to the output voltage controlling means.

In this case, preferably the output voltage controlling means is constructed by a voltage divider circuit for detecting the output voltage of the converter, a reference voltage generating circuit, an error detecting circuit for generating an error output signal by comparing a detected voltage generated by the voltage divider circuit with a reference voltage generated by the reference voltage generating circuit, and an output voltage adjusting circuit for adjusting the output voltage of the converter based on the error output signal generated by the error detecting circuit.

Then, in one preferred embodiment, the operating power supply supplying means is constructed to supply intermittently the operating power supply to any circuit of the voltage divider circuit, the reference voltage generating circuit, the error detecting circuit, and the output voltage adjusting circuit.

Also, in another preferred embodiment, the operating power supply supplying means is constructed to stop simultaneously supply of the operating power supply to plural circuits out of the voltage divider circuit, the reference voltage generating circuit, the error detecting circuit, and the output voltage adjusting circuit and to supply simultaneously the operating power supply to the plural circuits.

Further, in other preferred embodiment, the operating power supply supplying means is constructed to stop simultaneously supply of the operating power supply to the voltage divider circuit, the reference voltage generating circuit, the error detecting circuit, and the output voltage adjusting circuit and to supply simultaneously the operating power supply to respective circuits.

Then, in above embodiments, the operating power supply supplying means is constructed to execute a driving operation of a switching element, which controls the output voltage of the converter based on the error output signal fed from the error detecting circuit, and to stop supply of the operating power supply fed from the operating power supply supplying means in response to a period of a driving operation of the switching element.

In this case, preferably the DC—DC converter further comprises a timing generating circuit for detecting the period of the driving operation of the switching element; wherein the timing generating circuit is constructed to stop supply of the operating power supply fed from the operating power supply supplying means in response to the period of the driving operation of the switching element.

Also, it is desired that the timing generating circuit is constructed to change a supply stop period of the operating power supply fed from operating power supply supplying means in response to the period of the driving operation of the switching element.

In addition, it is desired that the timing generating circuit is constructed to cause switching means, which constitute the operating power supply supplying means, to execute an ON/OFF operation by using a reference clock that manages a driving timing of the switching element.

Also, a control signal indicating a load state in a load circuit, which utilizes the output voltage of the converter, is further supplied to the timing generating circuit, and the timing generating circuit is constructed to control the ON/OFF operation of the switching means, which constitute the operating power supply supplying means, in response to the control signal indicating the load state.

Also, it is desired that the timing generating circuit is constructed to ON-control the switching means, which constitute the operating power supply supplying means, by using the reference clock before the ON/OFF operation of the switching means is executed and to supply the operating power supply to the output voltage controlling means.

Then, a current is supplied to a coil from a DC power supply on a primary side by an ON operation of the switching means to execute an operation for accumulating an electromagnetic energy, and the energy accumulated in the coil is discharged by an OFF operation of the switching means to increase the output voltage.

In addition, a switching driving signal supplied from the output voltage adjusting circuit to the switching means is a switching driving signal that is modulated by a PFM system or a PWM system.

Meanwhile, in order to achieve the above object, a DC—DC converter driving method of the present invention of driving a DC—DC converter that has an output voltage controlling means for getting an output voltage of a converter and then controlling the output voltage of the converter within a predetermined range based the voltage, comprises the step of supplying an operating power supply, which operates the output voltage controlling means, intermittently to the output voltage controlling means.

In this case, in one preferred driving method, the operating power supply is supplied intermittently to any circuit out of a voltage divider circuit for detecting the output voltage of the converter, a reference voltage generating circuit, an error detecting circuit for generating an error output signal by comparing a detected voltage generated by the voltage divider circuit with a reference voltage generated by the reference voltage generating circuit, and an output voltage adjusting circuit for adjusting the output voltage of the converter based on the error output signal generated by the error detecting circuit, which constitute the output voltage controlling means.

Also, in another preferred driving method, supply of the operating power supply to plural circuits out of a voltage divider circuit for detecting the output voltage of the converter, a reference voltage generating circuit, an error detecting circuit for generating an error output signal by comparing a detected voltage generated by the voltage divider circuit with a reference voltage generated by the reference voltage generating circuit, and an output voltage adjusting circuit for adjusting the output voltage of the converter based on the error output signal generated by the error detecting circuit, which constitute the output voltage controlling means, is stopped simultaneously, and also the operating power supply to the plural circuits is supplied simultaneously.

Further, in other preferred driving method, supply of the operating power supply to a voltage divider circuit for detecting the output voltage of the converter, a reference voltage generating circuit, an error detecting circuit for generating an error output signal by comparing a detected voltage generated by the voltage divider circuit with a reference voltage generated by the reference voltage generating circuit, and an output voltage adjusting circuit for adjusting the output voltage of the converter based on the error output signal generated by the error detecting circuit, which constitute the output voltage controlling means, is stopped simultaneously, and also the operating power supply to respective circuits is supplied simultaneously.

Then, if any of above driving methods is employed, preferably an operating power supply supplying means for supplying intermittently an operating power supply that operates the output voltage controlling means is provided, and the operating power supply supplying means is constructed to decide a supply timing of the operating power supply in response to a control operation of the output voltage of the converter by the output voltage controlling means.

In addition, it is desired that an operating power supply supplying means for supplying intermittently an operating power supply that operates the output voltage controlling means is provided, and the operating power supply supplying means is constructed to decide a supply timing of the operating power supply by a control signal indicating a load state in a load circuit that uses the output voltage of the converter.

According to the DC—DC converter employing the above driving method, the output voltage adjusting circuit that controls the output voltage of the converter in the predetermined range is controlled by the error output signal fed from the error detecting circuit, and drives the switching elements in synchronism with the reference clock signal fed from the reference clock generating circuit. Therefore, the output voltage of the converter can be controlled in the predetermined range.

While, the signal indicating the driving state of the switching elements is supplied from the output voltage adjusting circuit to the timing generating circuit. The timing generating circuit can grasp the period of the driving operation of the switching elements, and then the operation for stopping the supply of the operating power supply to the output voltage controlling means is carried out by opening the switching elements, which constitute the operating power supply supplying means, if the period is longer than the predetermined period.

That is, if the period of the driving operation of the switching means is longer than the predetermined period, it can be decided that the load is set in the light state. In this case, in the period during when it is not required to execute the driving operation of the switching elements, there is no necessity that other circuits containing the output voltage adjusting circuit that drives the switching elements should be operated continuously. Therefore, the power supplied to respective circuits of the output voltage controlling means can be stopped temporarily in the above period by opening the switching means, which constitute the operating power supply supplying means. As a result, the utilization efficiency of the power in the light load situation can be improved.

In the case that the above control is carried out, the supply of the operating power supply to any circuit out of the voltage divider circuit, the reference voltage generating circuit, the error detecting circuit, and the output voltage adjusting circuit, which constitute the output voltage controlling means, may be temporarily stopped. Also, the supply of the operating power supply to all circuits may be temporarily stopped.

In addition, if the above timing generating circuit controls such that the period of the driving operation of the switching elements is grasped and then the supply stopping period of the operating power supply is changed in response to the period of the driving operation of the switching elements, the utilization efficiency of the power can be improved. Also, if the timing generating circuit is constructed to introduce the control signal indicating the load state, the load varying situation can be grasped previously not to depend on the control operation of the output voltage by the above output voltage controlling means. As a result, if this means is employed, the output voltage of the converter can be managed in the predetermined range particularly in the circumstances that the load is abruptly varied.

DETAILED DESCRIPTION OF THE PREFERRED EMBODIMENTS

Figure 1:
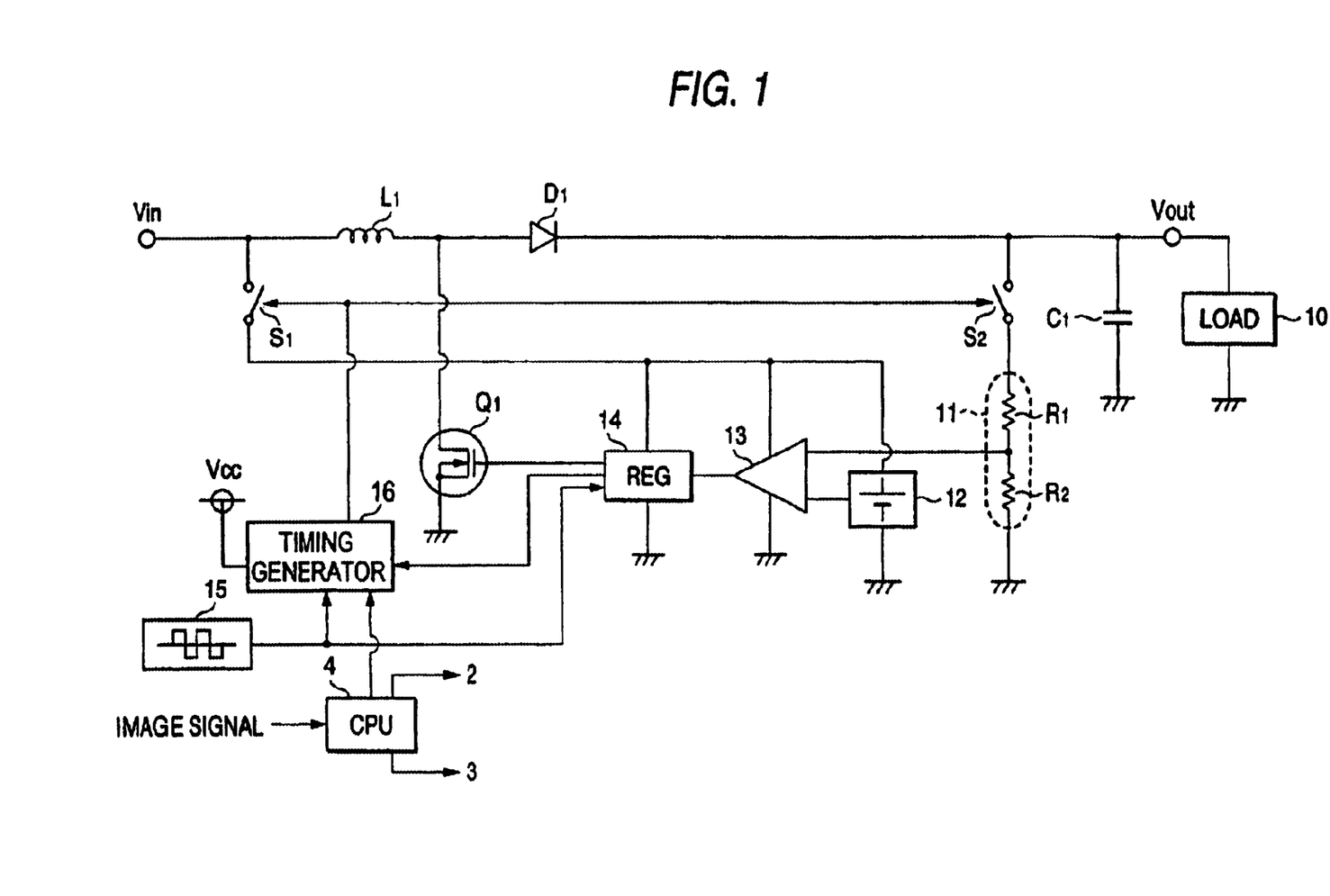
FIG. 1 is a block diagram showing an embodiment of a DC—DC converter according to the present invention.

Preferred embodiments of a DC—DC converter according to the present invention will be explained with reference to Figures hereinafter. FIG. 1 is a block diagram showing an embodiment of a DC—DC converter according to the present invention. In FIG. 1, portions corresponding to respective constituent elements already explained in FIG. 5 are denoted by the same symbols, and thus their detailed explanation will be omitted appropriately.

In FIG. 1, symbols S1, S2 denote a switching means constituting an operating power supply supplying means respectively. The switching means S1, S2 are constructed such that their ON/OFF operations are simultaneously carried out by the control signal from a timing generating circuit 16. Then, the switching means S1 is constructed to supply the power supply, which is supplied to the input terminal Vin from the primary power source, e.g. the battery, to the reference voltage generating circuit 12, the error amplifier 13 as the error detecting circuit, and the regulator circuit 14 constituting the output voltage adjusting circuit, which constitute the output voltage controlling means. Also, the switching means S2 is constructed to supply the output voltage to the voltage divider circuit 11 from the output terminal Vout.

The timing generating circuit 16 functions to cause the switching means S1, S2 to turn ON/OFF, and the signal indicating the driving operation of the switching element Q1 by the regulator circuit 14 is supplied to the timing generating circuit 16. Also, the reference clock signal that is fed from the reference clock generating circuit is supplied to the timing generating circuit 16. This timing generating circuit 16 functions to supply the operating power supply intermittently to the output voltage controlling means by ON/OFF-operating the switching means S1, S2 based on the reference clock signal.

In this embodiment, a control signal indicating the loaded state of the converter is supplied to the timing generating circuit 16 from an arithmetic circuit 4. As a result, the timing generating circuit 16 can also control the ON/OFF operation of the switching means S1, S2 by the control signal that is fed from the arithmetic circuit 4 to indicate the loaded state.

Figure 2:
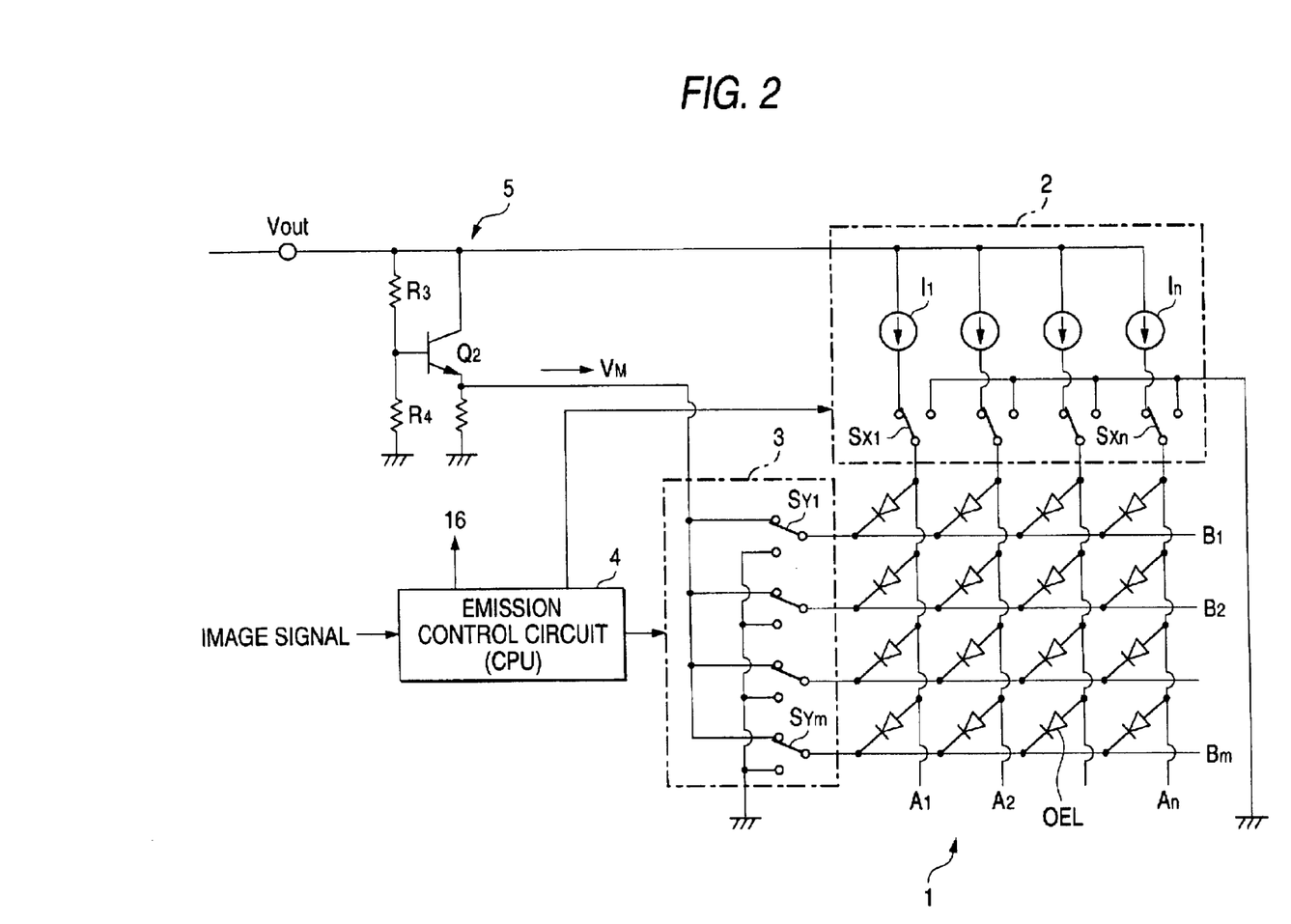
FIG. 2 is a wiring diagram showing an example of a load circuit connected to the converter shown in FIG. 1.

FIG. 2 shows an example of a load circuit that operates as the load 10 of the converter shown in FIG. 1, and explains mainly the function of the arithmetic circuit 4 that feeds the control signal to the above timing generating circuit 16. The load circuit shown in FIG. 2 shows the driving circuit that emits/drives the organic EL display. That is, in a display panel 1 constituting the organic EL display, anode line A1 to An are arranged as n-drive lines in the vertical direction and also cathode lines B1 to Bm are arranged as m-scanning lines in the lateral direction, and organic EL elements OEL indicated by a symbol mark of the diode are arranged at respective intersecting portions (n×m locations in total).

Then, respective EL elements constituting the pixels are arranged in a lattice fashion. In order to correlate with the intersecting positions between the anode line A1 to An arranged along the vertical direction and the cathode lines B1 to Bm arranged along the horizontal direction, one ends of the EL elements (anode terminals of the equivalent diodes) are connected to the anode line and the other ends of the EL elements (cathode terminals of the equivalent diodes) are connected to the cathode line. Also, the anode lines are connected to an anode line driving circuit 2 and driven by the circuit 2, and also the cathode lines are connected to a cathode line scanning circuit 3 and driven by the circuit 3.

Scanning switches SY1 to SYm are provided to the cathode line scanning circuit 3 to correspond to respective cathode lines B1 to Bm. The scanning switches SY1 to SYm act to connect any one of a reverse bias voltage ($V_M$), which is fed from a reverse bias voltage generating circuit 5 to prevent the crosstalk emission, and the ground potential as the reference potential point to the corresponding cathode line scanning line respectively. Also, constant-current circuits I1 to In, which supply the driving current to individual EL elements via respective anode lines, and driving switches SX1 to SXn are provided to the anode line driving circuit 2.

The driving switches SX1 to SXn act to connect any one of the currents supplied from the constant-current circuits I1 to In and the ground potential to corresponding anode lines respectively. Therefore, when the driving switches SX1 to SXn are connected to the constant-current circuit side, the currents fed from the constant-current circuits I1 to In are supplied to individual EL elements that are arranged to correspond to the cathode line scanning lines.

Then, the DC output fed from the DC—DC converter shown in FIG. 1 is supplied to the constant-current circuits I1 to In in the anode line driving circuit 2. Also, the reverse bias voltage generating circuit 5 is constructed by the voltage divider circuit that divides the DC voltage fed from the converter. That is, this voltage divider circuit is constructed by resistors R3, R4 and an npn transistor Q2 serving as the emitter follower. The reverse bias voltage generated in this manner is supplied to the cathode lines in the non-scanning state, and then utilized to prevent the crosstalk of the EL elements.

Control buses are connected to the anode line driving circuit 2 and the cathode line scanning circuit 3 from an emission control circuit 4 containing the CPU as the arithmetic circuit. The scanning switches SY1 to Sym and the driving switches SX1 to SXn are operated based on the image signal that is supplied to the emission control circuit 4 and is to be displayed. Therefore, the constant-current circuits are connected to the desired anode lines while setting the cathode line scanning lines to the ground potential at a predetermined period based on the image signal. As a result, respective light emitting elements are caused to emit selectively and thus the image based on the image signal is reproduced on the display panel.

The arithmetic circuit 4 constituting the emission control circuit, as described above, functions to drive the anode line driving circuit 2 and the cathode line scanning circuit 3 based on the image signal supplied to this arithmetic circuit 4. Therefore, the arithmetic circuit 4 can grasp sequentially the load state by lightening/driving respective EL elements selectively based on the supplied image signal. Then, as shown in FIG. 1, the control signal indicating the load state is supplied to the timing generating circuit 16 to control the ON/OFF operations of the switching means S1, S2.

Figure 3A:
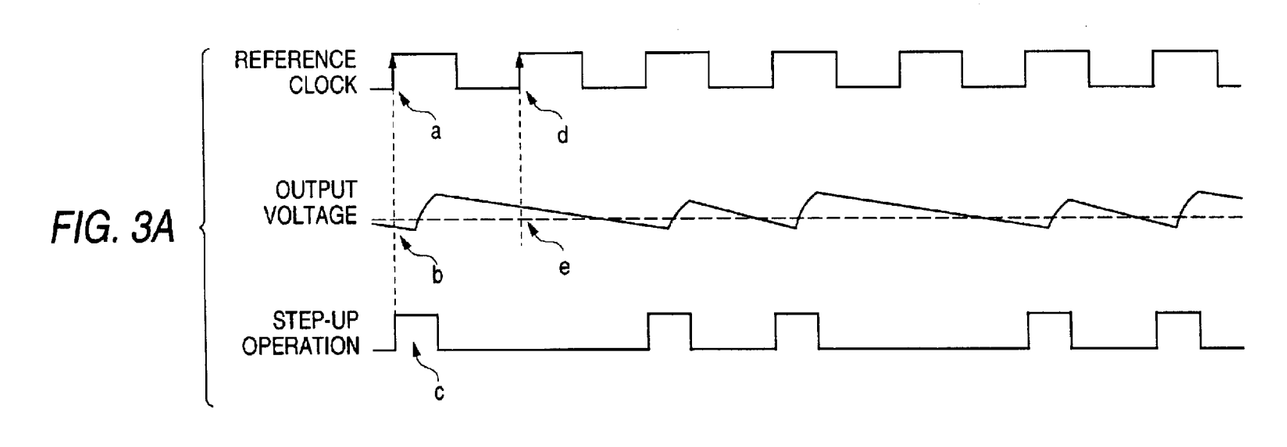
FIGS. 3A and 3B are timing charts explaining a control mode of an output voltage in the converter shown in FIG. 1.
Figure 3B:
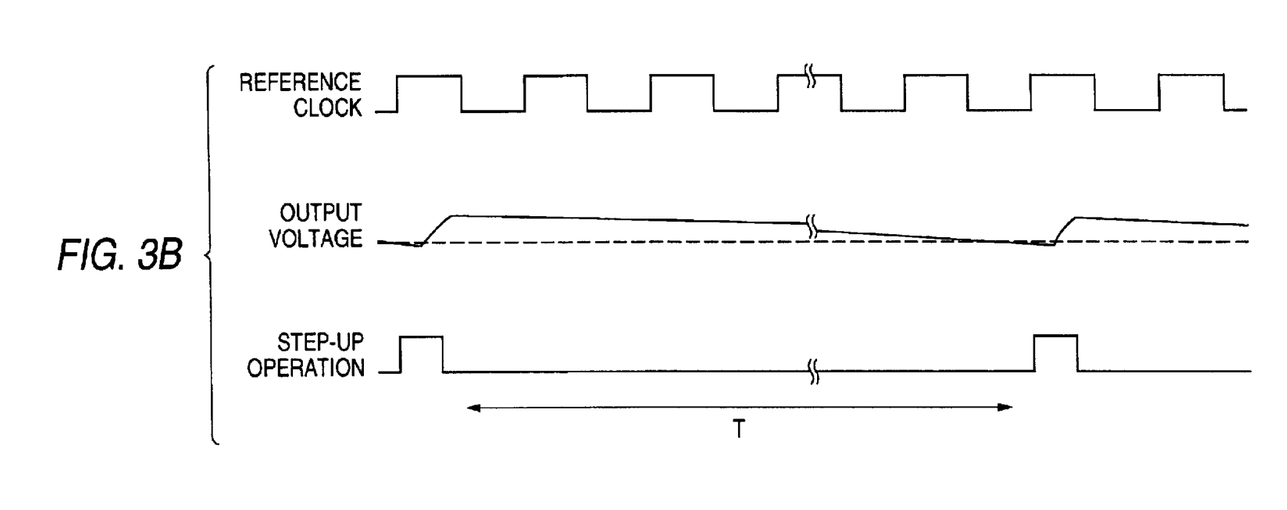

FIGS. 3A and B explain a control mode of the output voltage in the DC-Dc converter shown in FIG. 1. In FIGS. 3A and B, there is shown an example in which the PFW system is utilized as the output voltage controlling method. Here, FIG. 3A shows the state that the heavy load is applied as the load of the converter, and FIG. 3B shows the state that the light load is applied. Then, the reference clock shown in FIGS. 3A and 3B is supplied from the reference clock generating circuit 15, and waveforms shown as the output voltage provide the output voltage at the output terminal Vout of the converter. Also, waveforms shown as the step-up operation provide timings at which the output voltage is increased based on the electromagnetic energy, which is accumulated in the coil L1, by causing the above switching elements to execute the ON/OFF operation.

In this case, it is possible to say that the waveforms shown in FIGS. 3A and 3B as the output voltage are the detected voltage obtained by the voltage divider circuit 11. Also, it is possible to say that the reference line, which is indicated by a broken line in the waveform of the output voltage, is the voltage level of the reference voltage fed from the reference voltage generating circuit 12.

Here, as shown in FIG. 3A, the regulator circuit 14 receives the error output from the error amplifier 13 at a rising time point (a) of the reference clock. That is, the error amplifier 13 supplies the error output signal, which corresponds to the difference of the output voltage (detected voltage) to the reference voltage, to the regulator circuit 14. If the detected voltage is lower than the reference voltage as shown at a time point (b), the step-up operation is carried out as shown by c. In this case, the driving signal that ON-controls the switching element Q1 is sent out from the regulator circuit 14, and thus the operation for turning the switching element Q1 ON for a predetermined time and then turning such switching element Q1 OFF is carried out.

Accordingly, the current flows from the primary DC power supply to the coil L1 and then the accumulating operation of the electromagnetic energy is executed in the coil L1. Then, the energy accumulated in the coil L1 is discharged by the OFF operation of the switching element Q1. In this case, the output voltage is increased by charging the capacitor C1. Also, the regulator circuit 14 receives similarly the error output from the error amplifier 13 again at a rising time point (d) of the subsequent reference clock. At this time, the detected voltage is in the state that such voltage is higher than the reference voltage as shown by e. In this case, the step-up operation is not carried out. The output voltage value can be controlled within the predetermined range by repeating above operations.

FIG. 3B shows the light load state as described above, and the reduction in the output voltage becomes extremely slow rather than the operation mode shown in FIG. 3A. Accordingly, the period during which the step-up operation is carried out is extended correspondingly. In other words, in such light load state, even if respective operations of the voltage divider circuit 11, the reference voltage generating circuit 12, the error amplifier 13, and the regulator circuit 14, which constitute the output voltage controlling means, are stopped, the operation for controlling the output voltage of the converter is not disturbed at all in the period T in which the subsequent step-up operation is carried out after the execution of the step-up operation.

Therefore, the timing generating circuit 16 operates to acquire the timing information, at which the above step-up operation is carried out, from the regulator circuit 14 and to calculate the period. Then, if it is decided that the state in which the period is long is continued to some extent, the operation for turning OFF temporarily the switching means S1, S2 constituting the operating power supply supplying means is carried out in synchronism with the reference clock fed from the reference clock generating circuit 15. Then, the reference clock is counted up, and then the switching means S1, S2 are turned ON in the state the predetermined number of the reference clocks is counted. Accordingly, the operating power supply of the output voltage controlling means is turned ON again, and thus the situation that the subsequent step-up operation can be carried out is brought about.

For this reason, in the situation that the converter is set in the light load state, the operating power supply can be supplied intermittently to the output voltage controlling means, as described above, and therefore the power consumed in the output voltage controlling means can be reduced. As a result, the utilization efficiency of the power in the light load state can be improved.

Figure 4:
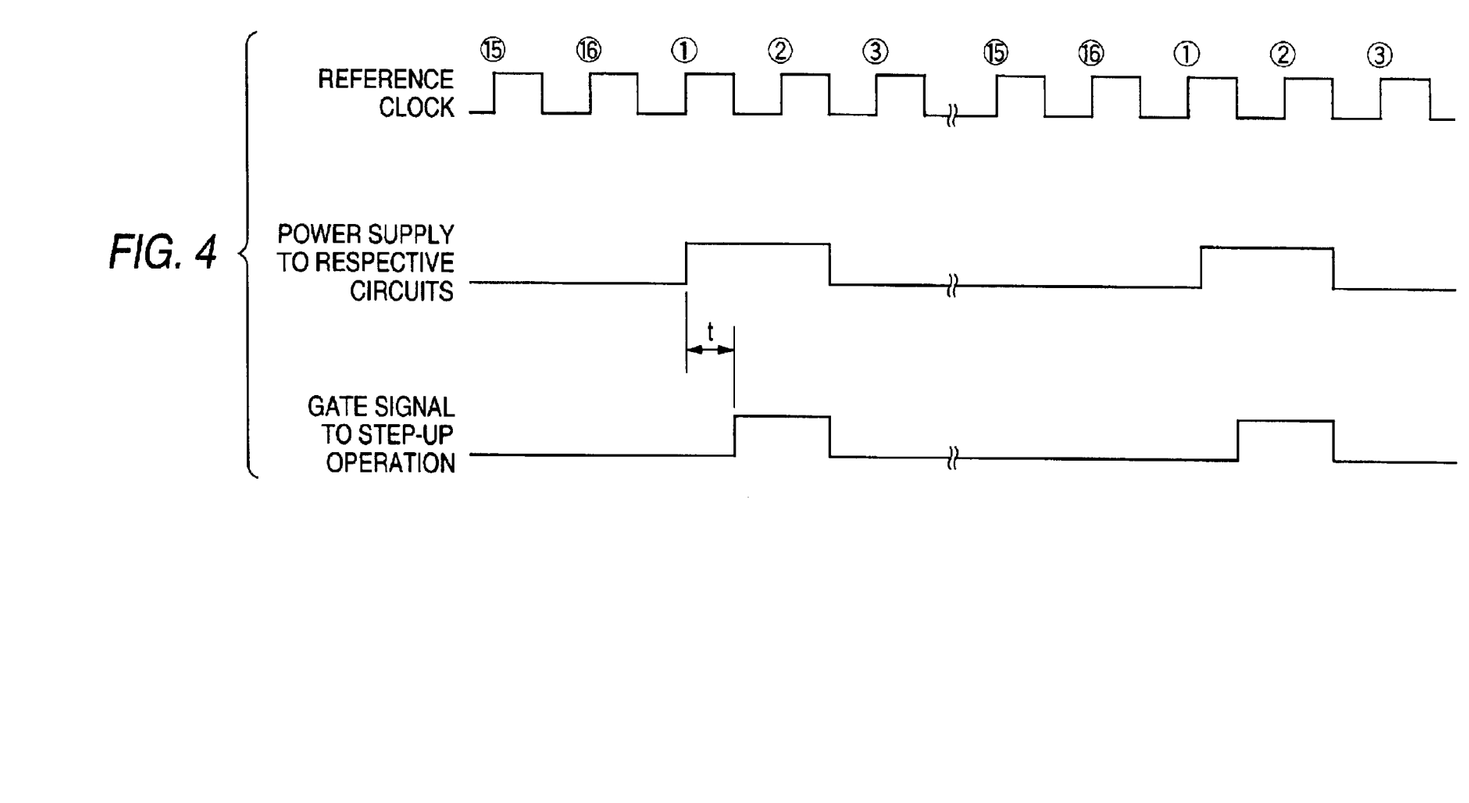
FIG. 4 is a timing chart explaining a turning-ON operation of an operating power supply for an output voltage controlling means in the same converter.

FIG. 4 is a timing chart explaining a preferred embodiment that the ON/OFF control of the switching means S1, S2 executed by the timing generating circuit 16 is carried out in the above light load state, as described above. In this embodiment, the situation that the step-up operation can be carried out is brought about by executing the ON operation of the switching means S1, S2 every 16-periods of the reference clock.

More particularly, the timing generating circuit 16 operates to turn ON the switching means S1, S2 at the time when the reference clock shown as ① in FIG. 4 comes in. Accordingly, the operating power supply is supplied to the output voltage controlling means consisting of the voltage divider circuit 11, the reference voltage generating circuit 12, the error amplifier 13, and the regulator circuit 14 to bring them into the operable state. Then, as already explained with reference to FIG. 3, the regulator circuit 14 executes the step-up operation if the output voltage (detected voltage) is smaller than the reference voltage. The timing chart at the lower stage in FIG. 4 shows the state that a gate signal (driving signal) for the step-up operation, which instructs the switching element Q1 to execute the ON operation, is generated from the regulator circuit 14.

Then, the timing generating circuit 16 executes the OFF-control of the switching means S1, S2 at a time point when the sending-out of the gate signal for the step-up operation is ended, i.e., at a rising timing of the reference clock ② in the example shown in FIG. 4. In turn, the same operation as the above is carried out at the 16-th period of the reference clock. In this case, the state that the gate signal for the step-up operation is also generated at the subsequent 16-th period is shown in FIG. 4. However, if the output voltage (detected voltage) is higher than the reference voltage at this point of time, the step-up operation is not carried out.

Now, as shown in FIG. 4, the timing generating circuit 16 is constructed to ON-control the switching means S1, S2 constituting the operating power supply supplying means based on the reference clock prior to the timing at which the step-up operation is carried out, and to supply the operating power supply to the output voltage controlling means previously. That is, it is set that the timing comes in after the time t has been lapsed after the operating power supply of the output voltage controlling means is turned ON. This is because the analog amplifier is often employed in the error amplifier 13 and the regulator circuit 14 and thus the warm-up period is required to some extent in some case until the circuits can operate stably after the operating power supply is supplied.

In the above embodiment, if the operation is carried out at the time of the light load, the interval of the step-up operation is decided based on the previously-estimated load. Then, even if the load becomes heavier than the estimated load and thus such a operation is caused that the step-up operation is executed every time at every step-up timing (every 16-periods of the reference clock in the example in FIG. 4), the timing generating circuit 16 detects this operation and causes the switching means S1, S2 to continue the ON-control. Also, in the above embodiment, even if the load becomes lighter than the estimated load and thus the frequency at which the step-up operation is not executed at every step-up timing is increased, the timing generating circuit 16 operates to supply the operating power supply to respective circuits constituting the output voltage controlling means every 16-periods of the reference clock.

Accordingly, if the interval of the step-up timing is set to follow up the load automatically, the utilization efficiency of the power can be improved much more. In order to realize this setting, it is desired that the timing generating circuit 16 gets the information concerning whether or not the step-up operation is actually carried out at every step-up timing from the regulator circuit 14, and then the timing generating circuit 16 changes the interval of the step-up timing, i.e., the step-up timing setting period, in response to the reference clock by the decision routine that is previously decided based on this information.

As the algorithm to realize the above method, following means may be employed. For instance, in the following cases, the operation to prolong the period of the step-up timing is carried out. That is, (1) the step-up operation is not carried out the g times at the step-up timing successively, and (2) the step-up operation is carried out less than i times out of the h step-up timings.

Also, for instance, in the following cases, the operation to shorten the period of the step-up timing is carried out.

(3) the step-up operation is carried out twice at the step-up timing successively, and (4) the step-up operation is carried out more thank times out of the j step-up timings.

The dead power that is consumed in respective circuits constituting the output voltage controlling means can be reduced as much as possible by setting appropriately above parameters g to k while holding the appropriate margin. Then, if the interval is shortened until the interval of the step-up timings becomes equal to the reference clock, the operating power supply is always supplied to the output voltage controlling means, like the prior art, and thus the continuous operation is carried out.

Meanwhile, as described above, the load information is supplied to the timing generating circuit 16 from the arithmetic circuit 4. According to this, for example, in the case that the luminous intensity is controlled to increase from the state that the luminous intensity of the organic EL display panel 1 is set low to display, etc., the control switching information can be supplied immediately from the arithmetic circuit 4, that controls the luminance of the display panel 1, to the timing generating circuit 16. In this manner, for example, in the case that the information indicating that the load is increased is obtained, the timing generating circuit 16 can control to continue the ON-control of the switching means S1, S2 constituting the operating power supply supplying means. As a result, the reduction in the output voltage of the converter because of the sudden variation of the load can be suppressed effectively.

Also, the timing generating circuit 16 can grasp the level of the load previously by getting the signal indicating to the degree of the load from the arithmetic circuit 4. Therefore, the turning-ON interval of the operating power supply of respective circuits constituting the output voltage controlling means can be changed appropriately in response to the degree of the load.

In this case, in the configuration shown in FIG. 1, in the state that the operating power supply of the voltage divider circuit 11, the reference voltage generating circuit 12, the error amplifier 13, and the regulator circuit 14, which constitute the output voltage controlling means, is cut off, the timing generating circuit 16 must be still operated. However, the above timing generating circuit can be designed to reduce the power consumption very small, and thus the total power consumption in the light load state can be reduced considerably.

Also, in the above embodiment, the operating power supply of the voltage divider circuit 11, the reference voltage generating circuit 12, the error amplifier 13, and the regulator circuit 14, which constitute the output voltage controlling means is simultaneously supplied and simultaneously cut off by the switching means S1, S2. In this case, for example, if the operating power supply is supplied intermittently to any of respective circuits, such configuration can contribute to improve the utilization efficiency of the power. Also, in the above embodiment, the lighting/driving circuit of the organic EL display panel is employed as the load circuit. In this case, the utilization of the present invention is not limited to such particular application, and the present invention may be preferably utilized in the circuit whose load is varied. Also, the step-up DC—DC converter is shown in the above embodiment, but the step-down or polarity-inversion DC—DC converter may be employed.

In addition, the MOSFET is employed as the switching element in the above embodiment, but other switching element such as the bipolar transistor, etc. can be employed. Further, the output obtained by the coil is extracted to the output terminal via the diode in the above embodiment, but the so-called synchronous commutating system that controls the ON/OFF timing by using the switching element such as the transistor in place of the diode may be employed. Moreover, the above explanation is made with reference to the example that the PFM system is employed as the control system of the output voltage of the converter, but the PWM system may be employed.

As apparent from the above explanation, the DC—DC converter that employs the driving method according to the present invention is constructed such that the operating power supply can be supplied intermittently to the output voltage controlling means that controls the output voltage of the converter. Therefore, the power consumed in the output voltage controlling means can be reduced in the light load state, for example. As a result, the DC—DC converter whose utilization efficiency of the power can be improved can be provided.

What is claimed is:

1. A power conserving regulator having an intermittently connectable controller, the power conserving regulator comprising:

an output voltage controller configured to control an output voltage to be within a predetermined range; and an operating power supply unit configured to supply an operating power to the output voltage controller intermittently, wherein the output voltage controller comprises: a voltage divider circuit for detecting the output voltage of the converter; a reference voltage generating circuit; an error detecting circuit for generating an error output signal by comparing a detected voltage generated by the voltage divider circuit with a reference voltage generated by the reference voltage generating circuit; and an output voltage adjusting circuit for adjusting the output voltage of the converter based on the error output signal generated by the error detecting circuit.

2. The power conserving regulator according to claim 1, wherein the operating power supply supplying unit supplies intermittently the operating power supply to any circuit of the voltage divider circuit, the reference voltage generating circuit, the error detecting circuit, and the output voltage adjusting circuit.

3. The power conserving regulator according to claim 1, wherein the operating power supply supplying unit stops simultaneously supply of the operating power supply to plural circuits out of the voltage divider circuit, the reference voltage generating circuit, the error detecting circuit, and the output voltage adjusting circuit and to supply simultaneously the operating power supply to the plural circuits.

4. The power conserving regulator according to claim 1, wherein the operating power supply supplying unit stops simultaneously supply of the operating power supply to the voltage divider circuit, the reference voltage generating circuit, the error detecting circuit, and the output voltage adjusting circuit and to supply simultaneously the operating power supply to respective circuits.

5. The power conserving regulator according to claim 2, wherein the operating power supply supplying unit executes a driving operation of a switching unit, which controls the output voltage of the converter based on the error output signal fed from the error detecting circuit, and to stop supply of the operating power supply fed from the operating power supply supplying unit in response to a period of a driving operation of the switching unit.

6. The power conserving regulator according to claim 5, further comprising a timing generating circuit for detecting the period of the driving operation of the switching unit;
wherein the timing generating circuit stops supply of the operating power supply fed from the operating power supply supplying unit in response to the period of the driving operation of the switching unit.

7. The power conserving regulator according to claim 6, wherein the timing generating circuit changes a supply stop period of the operating power supply fed from operating power supply supplying unit in response to the period of the driving operation of the switching unit.

8. The power conserving regulator according to claim 6, wherein the timing generating circuit causes a switching unit, which constitute the operating power supply supplying unit, to execute an ON/OFF operation by using a reference clock that manages a driving timing of the switching element.

9. The power conserving regulator according to claim 6, wherein a control signal indicating a load state in a load circuit, which utilizes the output voltage of the converter, is further supplied to the timing generating circuit, and the timing generating circuit is constructed to control the ON/OFF operation of the switching unit, which constitute the operating power supply supplying unit, in response to the control signal indicating the load state.

10. The power conserving regulator according to claim 8, wherein the timing generating circuit controls the ON operation of the switching unit, which constitute the operating power supply supplying unit, by using the reference clock before the ON/OFF operation of the switching unit is executed and to supply the operating power supply to the output voltage controller.

11. The power conserving regulator according to claim 5, wherein a current is supplied to a coil from a DC power supply on a primary side by an ON operation of the switching unit to execute an operation for accumulating an electromagnetic energy, and the energy accumulated in the coil is discharged by an OFF operation of the switching unit to increase the output voltage.

12. The power conserving regulator according to claim 5, wherein a switching driving signal supplied from the output voltage adjusting circuit to the switching unit is a switching driving signal that is modulated by a PFM system or a PWM system.

13. A method for controlling a power conserving regulator, the method comprising:
controlling an output voltage to be within a predetermined range by an output voltage controller; and
supplying an operating power to the output voltage controller intermittently,
wherein the operating power supply is supplied intermittently to any circuit out of a voltage divider circuit for detecting the output voltage of the converter, a reference voltage generating circuit, an error detecting circuit for generating an error output signal by comparing a detected voltage generated by the voltage divider circuit with a reference voltage generated by the reference voltage generating circuit, and an output voltage adjusting circuit for adjusting the output voltage of the converter based on the error output signal generated by the error detecting circuit, which constitute the output voltage controller.

14. A method for controlling a power conserving regulator, the method comprising:
controlling an output voltage to be within a predetermined range by an output voltage controller; and
supplying an operating power to the output voltage controller intermittently,
wherein supply of the operating power supply to plural circuits out of a voltage divider circuit for detecting the output voltage of the converter, a reference voltage generating circuit, an error detecting circuit for generating an error output signal by comparing a detected voltage generated by the voltage divider circuit with a reference voltage generated by the reference voltage generating circuit, and an output voltage adjusting circuit for adjusting the output voltage of the converter based on the error output signal generated by the error detecting circuit, which constitute the output voltage controller, is stopped simultaneously, and also the operating power supply to the plural circuits is supplied simultaneously.

15. A method for controlling a power conserving regulator, the method comprising:
controlling an output voltage to be within a predetermined range by an output voltage controller; and
supplying an operating power to the output voltage controller intermittently,
wherein supply of the operating power supply to a voltage divider circuit for detecting the output voltage of the converter, a reference voltage generating circuit, an error detecting circuit for generating an error output signal by comparing a detected voltage generated by the voltage divider circuit with a reference voltage generated by the reference voltage generating circuit, and an output voltage adjusting circuit for adjusting the output voltage of the converter based on the error output signal generated by the error detecting circuit, which constitute the output voltage controller, is stopped simultaneously, and also the operating power supply to respective circuits is supplied simultaneously.

16. A method for controlling a power conserving regulator, the method comprising:
controlling an output voltage to be within a predetermined range by an output voltage controller: and
supplying an operating power to the output voltage controller intermittently,
wherein an operating power supply supplying unit for supplying intermittently an operating power supply that operates the output voltage controller is provided, and the operating power supply supplying unit is constructed to decide a supply timing of the operating power supply in response to a control operation of the output voltage of the converter by the output voltage controller.

17. A method for controlling a power conserving regulator, the method comprising:

controlling an output voltage to be within a predetermined range by an output voltage controller; and supplying an operating power to the output voltage controller intermittently, wherein an operating power supply supplying unit for supplying intermittently an operating power supply that operates the output voltage controller is provided, and the operating power supply supplying unit is constructed to decide a supply timing of the operating power supply by a control signal indicating a load state in a load circuit that uses the output voltage of the converter.

* * * * *